United States Patent
Mohr

(10) Patent No.: US 12,200,095 B2
(45) Date of Patent: Jan. 14, 2025

(54) FEEDFORWARD JITTER CORRECTION

(71) Applicant: Mellanox Technologies, Ltd., Yokneam (IL)

(72) Inventor: Johan Jacob Mohr, Copenhagen (DK)

(73) Assignee: Mellanox Technologies, Ltd., Yokneam (IL)

( * ) Notice: Subject to any disclaimer, the term of this patent is extended or adjusted under 35 U.S.C. 154(b) by 218 days.

(21) Appl. No.: 17/848,148

(22) Filed: Jun. 23, 2022

(65) Prior Publication Data
US 2023/0421349 A1    Dec. 28, 2023

(51) Int. Cl.
*H04L 7/033* (2006.01)
*H04L 7/00* (2006.01)
*H04L 25/03* (2006.01)

(52) U.S. Cl.
CPC .......... *H04L 7/0331* (2013.01); *H04L 7/0025* (2013.01); *H04L 25/03038* (2013.01)

(58) Field of Classification Search
CPC ................ H04L 7/0331; H04L 7/0025; H04L 25/03038
See application file for complete search history.

(56) References Cited

U.S. PATENT DOCUMENTS

| | | | | |
|---|---|---|---|---|
| 4,262,360 A * | 4/1981 | Bigo | ................. | H04L 25/03038 375/321 |
| 9,143,371 B1 * | 9/2015 | Warner | ............. | H04L 25/03057 |
| 2020/0304352 A1 * | 9/2020 | Azenkot | ........... | H04L 25/03063 |
| 2021/0336761 A1 * | 10/2021 | Smith | ................... | H04L 7/0087 |
| 2023/0208686 A1 * | 6/2023 | Balan | ................ | H04L 25/03203 375/232 |

* cited by examiner

*Primary Examiner* — Freshteh N Aghdam
(74) *Attorney, Agent, or Firm* — Lowenstein Sandler LLP

(57) ABSTRACT

Technologies for jitter extraction are described. A receiver device includes an analog-to-digital converter (ADC) and a signal processing circuit. The signal processing circuit includes an equalizer block to output current data based on samples from the ADC. A clock-recovery (CR) block includes a timing error detector (TED) or a phase detector to measure a sampling offset. The CR block can use the sampling offset to control sampling of subsequent data by the ADC. A jitter extraction block can use the sampling offset to re-sample the current data to obtain re-sampled data based on the sampling offset to remove jitter from the current data.

20 Claims, 13 Drawing Sheets

FEEDFORWARD JITTER CORRECTION

TECHNICAL FIELD

At least one embodiment pertains to processing resources used to perform and facilitate network communication. For example, at least one embodiment pertains to feedforward jitter extraction.

BACKGROUND

Communications systems transmit and receive signals at a high data rate (e.g., up to 200 Gbits/sec). High-speed transmissions exhibit significant noise attributes (e.g., due to the transmission medium) that require the use of communication devices (e.g., transmitters and receivers) configured to perform digital pre-processing by the transmitter device and post-processing by the receiver device. High-speed data transmission in data centers and between computing and storage devices is often achieved without transmitting a data clock. This implies that the receiving device includes a clock-recovery circuit that recovers a data clock used to transmit the data. A conventional clock-recovery circuit includes a phase detector for controlling a receiver sampling clock in a closed-loop fashion. There can be clock jitter in the transmitter clock signal (called "transmitter clock jitter"). Transmitter clock jitter is a deviation of a clock edge from an ideal edge location. The conventional clock-recovery circuit performs error averaging in a feedback loop to reduce transmitter clock jitter. Due to a delay in the feedback loop of the clock-recovery circuit and the need for averaging, the feedback loop bandwidth should be limited to avoid amplification of the transmitter clock jitter above the loop bandwidth. However, limiting the loop bandwidth leaves some of the transmitter clock jitter untracked, referred to as "untracked sampling jitter." Untracked sampling jitter can be a major error contributor, limiting the achievable raw Bit Error Rate (BER) of the high-speed data transmission.

BRIEF DESCRIPTION OF DRAWINGS

Various embodiments in accordance with the present disclosure will be described with reference to the drawings, in which.

DETAILED DESCRIPTION

Technologies for jitter extraction are described. As described above, a feedback loop of a clock-recovery circuit has a limited loop bandwidth that can leave untracked sampling jitter which may be a major contributor to the BER of the high-speed transmission. Aspects and embodiments of the present disclosure address these and other challenges by providing a jitter correction block that can remove jitter based on a sampling offset (e.g., phase offset) in a feedforward manner. Aspects and embodiments of the present disclosure can provide a combination of a closed-loop tracking and open-loop compensation of sampling jitter. The combination of closed-loop tracking and open-loop compensation can allow higher bandwidth or better filtering of phase offsets (phase detector output) for feedforward correction than closed-loop tracking alone. In some implementations, only one phase detector can be used, improving hardware efficiency. In other implementations, a second or augmented phase detector can be used to improve feedforward correction independently of closed-loop tracking.

Aspects and embodiments of the present disclosure can provide a clock recovery (CR) block with a timing error detector (TED) to measure a sampling offset. The sampling offset can be used to control the sampling of subsequent data by an analog-to-digital converter (ADC) in a feedback manner. The same sampling offset can also be used to re-sample the current data based on the sampling offset. Aspects and embodiments of the present disclosure can provide a jitter extraction block with a filter coupled to the output of the TED and a re-sample block. The filter filters the sampling offset at a frequency greater than a frequency of the loop bandwidth of the CR block. The filter can be a running average using a special case of a finite impulse response (FIR) filter. The re-sample block can include an interpolation function, an FIR filter, and a multi-tap FIR filter (e.g., a three-tap FIR filter, a five-tap FIR filter, or longer). Aspects and embodiments of the present disclosure can improve sampling eyes for symbol detection by re-sampling a data signal based on the sampling offset to extract jitter from the data signal. By re-sampling the data signal based on the sampling offset, aspects and embodiments of the present disclosure can reduce residual jitter before a decision block, e.g., a symbol detector (e.g., a maximum likelihood sequence estimate (MLSE) block). By re-sampling the data signal based on the sampling offset, aspects and embodiments of the present disclosure can provide additional equalization after jitter extraction.

Figure 1A:
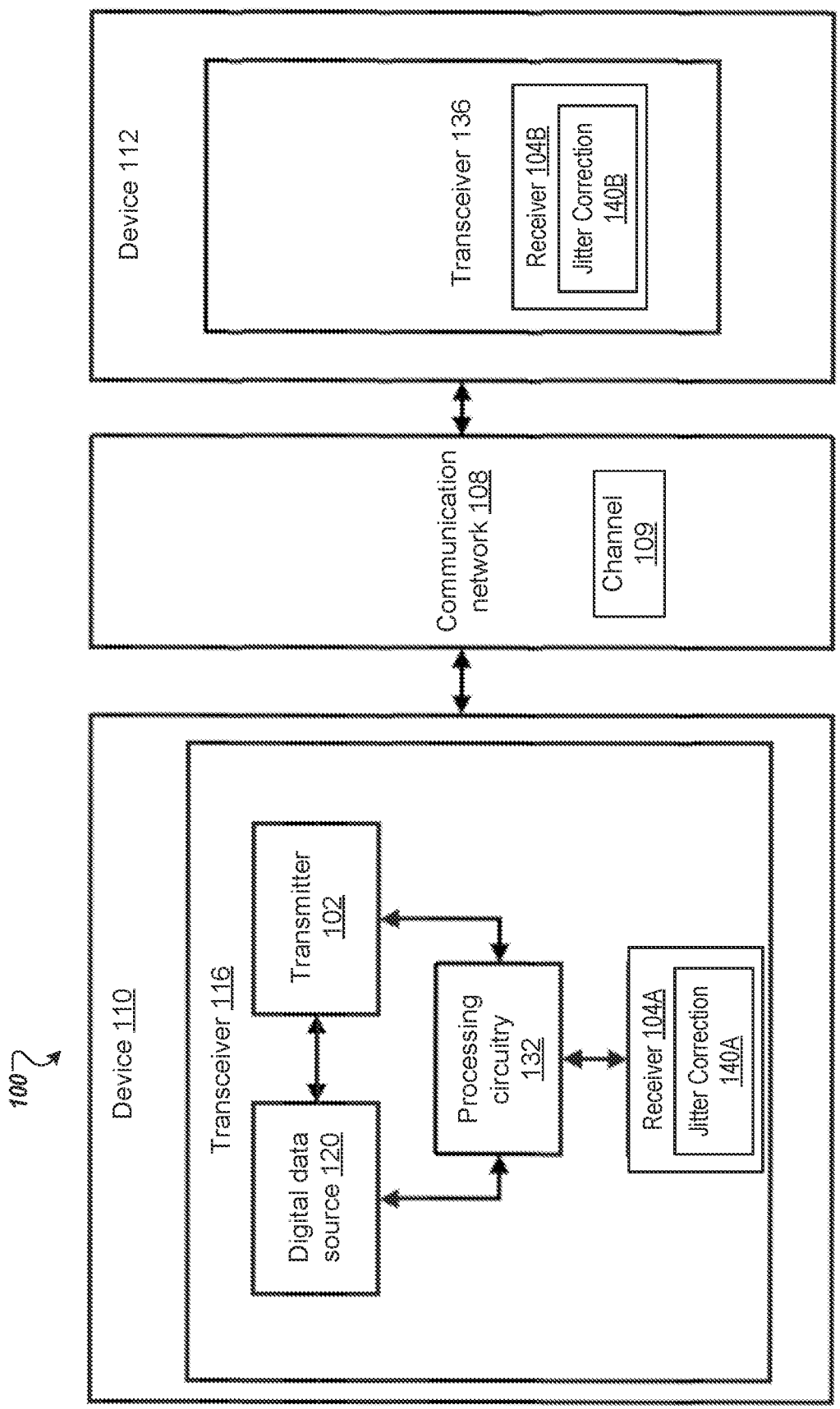
FIG. 1A illustrates an example communication system with a jitter correction block, in accordance with at least some embodiments.

FIG. 1A illustrates an example communication system 100 with a jitter correction block 140, in accordance with at least some embodiments. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices also connected to a common type of communication network 108. According to embodiments, the receiver 104A, 104B of devices 110 or 112 may correspond to a graphics processing unit (GPU), a switch (e.g., a high-speed network switch), a network adapter, a central processing unit (CPU), a data processing unit (DPU), etc. As another specific but non-limiting example, the devices 110 and 112 may correspond to servers offering information resources, services and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104A, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104B of device 112.

The receiver 104A, 104B of device 110 and device 112 may include suitable hardware and/or software for receiving signals, for example, data signals from the communication network 108. For example, the receivers 104A, 104B may include components for receiving processing signals to extract the data for storing in a memory. In at least one embodiment, the receiver 104B includes a jitter correction block 140B. In another embodiment, the receiver 104A also includes a jitter correction block 140A. The receiver 104B receives an incoming signal and samples the incoming signal to generate samples, such as using an ADC. The ADC can be controlled by a clock-recovery circuit (or clock recovery block) in a closed-loop tracking scheme. The clock-recovery circuit can include a phase detector (or a TED) that can measure a phase offset of the samples. The phase offset is also referred to as a sampling offset. The clock-recovery circuit can include a controlled oscillator, such as a voltage-controlled oscillator (VCO) or a digitally-controlled oscillator (DCO) that controls the sampling of the subsequent data by the ADC. The clock-recovery circuit can use other closed-loop tracking schemes to determine a sampling offset or phase offset. The jitter correction block 140B can use the phase offset (or sampling offset), measured by the phase detector (or a separate phase detector), to re-sample the current data to obtain re-sampled data in an open-loop compensation scheme. The re-sampling of the current data removes jitter from the current data. The jitter correction block 140B can be considered to be extracting or removing the jitter from the signal or cleaning the signal from the jitter. Additional details of the jitter correction block are discussed in more detail below with reference to the figures.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a CPU, A GPU, a DPU, a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 1B:
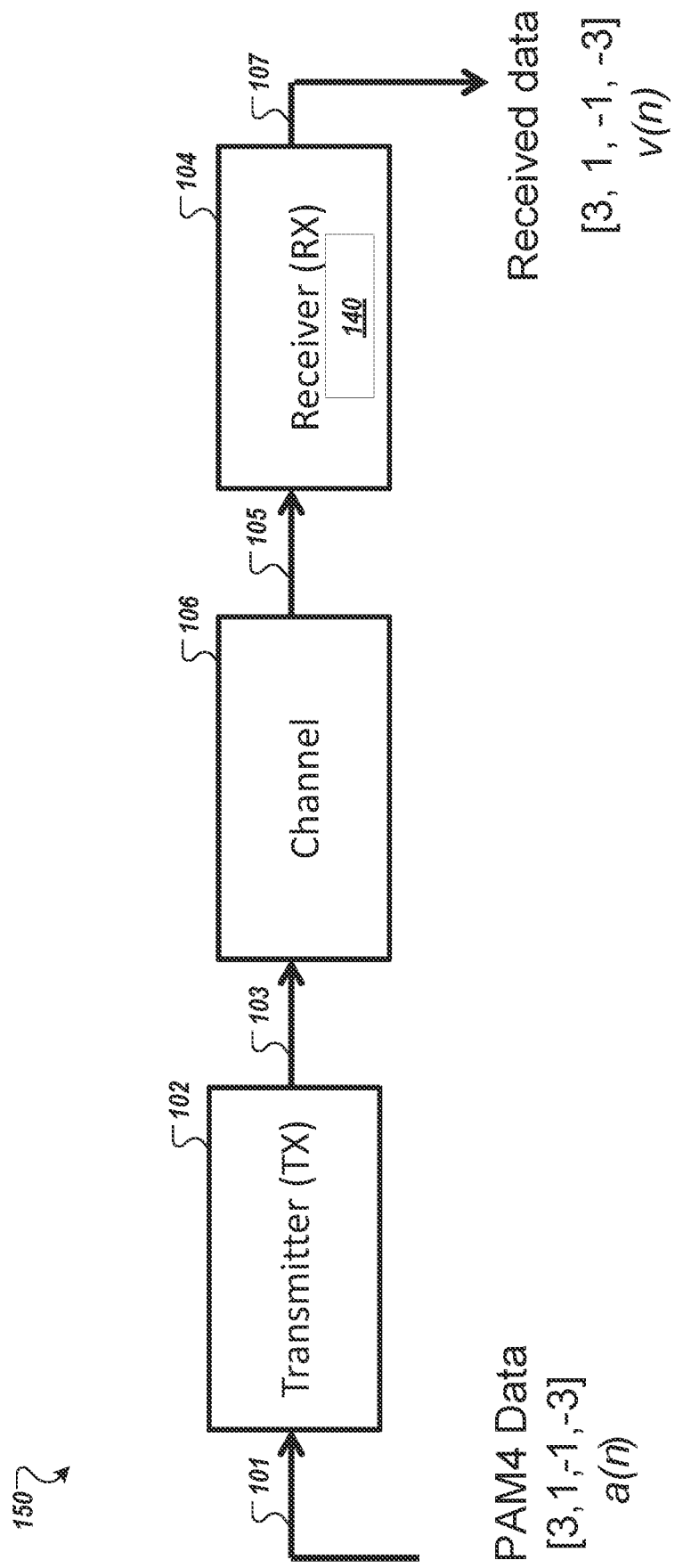
FIG. 1B is a block diagram of a communication system employing a jitter correction block in a receiver device, according to at least one embodiment.

FIG. 1B illustrates a block diagram of an example communication system 150 employing a jitter correction block 140 in a receiver 104, according to at least one embodiment. In the example shown in FIG. 1B, a PAM level-4 (PAM4) modulation scheme is employed with respect to the transmission of a signal (e.g., digitally encoded data) from a transmitter (TX) 102 to a receiver (RX) 104 via a communication channel 106 (e.g., a transmission medium). In this example, the transmitter 102 receives 101 an input data (i.e., the input data at time n is represented as "a(n)"), which is modulated in accordance with a modulation scheme (e.g., PAM4) and sends 103 the signal a(n) including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 106 is a destructive medium in that the channel acts as a low pass filter which attenuates higher frequencies more than it attenuates lower frequencies, introduces inter-symbol interference (ISI) and noise from cross talk, from power supplies, from Electromagnetic Interference (EMI), or from other sources. The communication channel 106 can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like.

As described above, in some communication systems, the transmitter 102 sends the signal 103 as a data signal without a transmitter clock used to generate the data signal. The receiver (RX) 104 receives an incoming signal 105 over the channel 106. The incoming signal 105 can be degraded and attenuated by the channel 106 and include noise. The incoming signal 105 can be affected by the transmitter clock jitter. The jitter correction block 140 can be used to compensate for the transmitter clock jitter as described herein. The jitter correction block 140 can extract the jitter before additional equalization and symbol detector logic in the receiver 104. The receiver 104 can output a received signal 107, "v(n)," including the set of data symbols (e.g., symbols −3, −1, 1, 3, wherein the symbols represent coded binary data). In at least one embodiment, the jitter correction block 140 can use phase detector information for closed-loop clock recovery and feedforward open-loop jitter correction to compensate for the residual untracked high-frequency jitter. Additional details of the jitter correction block 140 are discussed in more detail below with respect to FIG. 2.

Figure 2:
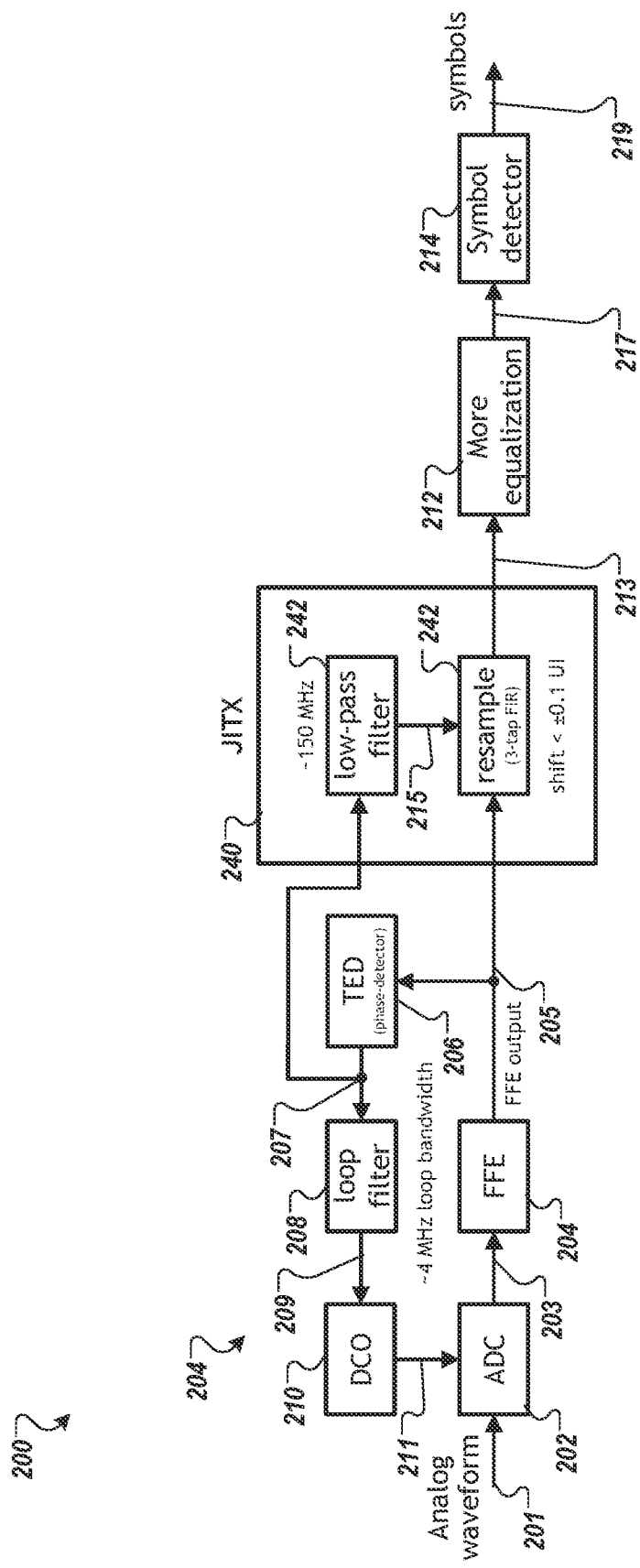
FIG. 2 is a block diagram of a receiver with a jitter extraction and correction block, according to at least one embodiment.

FIG. 2 is a block diagram of a receiver 200 with a jitter extraction and correction block 240, according to at least one embodiment. The receiver 200 includes an ADC 202 and a digital signal processing circuit 204, including one or more digital processing blocks. In the illustrated embodiment, the digital signal processing circuit 204 includes an equalizer block 250, a timing error detector (TED) 206, a loop filter 208, a controlled oscillator 210 (e.g., DCO, VCO, or the like), the jitter extraction and correction block 240, optional equalization block 212, and symbol detector 214.

The ADC 202 receives an incoming signal 201. The incoming signal 201 can be analog. The ADC 202 samples the incoming signal 201 and generates samples 203. The equalizer block 250 receives the samples 203 and generates an equalizer output 205 (or a reduced bandwidth signal for e.g. a DFE or a MLSE)). The equalizer output 205 can be an equalized signal. In at least one embodiment, the equalizer block 250 is a feedforward equalizer (FFE) block that generates an FFE output. In another embodiment, the equalizer block 250 includes a continuous-time linear equalizer (CTLE) and a FFE. In another embodiment, the equalizer block 250 includes only the CTLE or only the FFE. In another embodiment, other types of equalizer blocks can be used. The digital signal processing circuit 204 can include a clock recovery (CR) block with TED 206. In another embodiment, the digital signal processing circuit 204 includes a clock and data recovery (CDR) block with TED 206. In other embodiments, a phase detector (PD) block is used instead of TED 206, as described herein.

The TED 206 measures a sampling offset 207 at the equalizer output 205 (FFE output). In another embodiment, the TED 206 measure a phase offset or other phase information of the equalized output 205. For example, the sampling offset 207 can be a phase offset of current data. The sampling offset 207 (or the phase offset or phase information), measured by TED 206, can be used to control sampling by the ADC 202. In particular, the sampling offset 207 can be filtered by the loop filter 208 to generate a filtered sampling offset 209. The controlled oscillator 210 receives the filtered sampling offset 209 and generates a control signal 211 to control the sampling by the ADC 202. The control signal 211 can be a sampling clock of the ADC 202. The CR block can be part of a clock recovery loop in at least one embodiment. The clock recovery loop can be a closed-loop feedback loop. The CR block can include TED 206, a loop filter 208, and a controlled oscillator 210. The CR block uses the measurements by TED 206 to control the controlled oscillator 210 for sampling future data (future FFE data). In another embodiment, the CR block or the clock recovery loop can include other additional components or can be organized in other configurations. In at least one embodiment, the controlled oscillator 210 is a DCO. In another embodiment, the controlled oscillator 210 is a VCO. In at least one embodiment, the CR block can operate at a loop bandwidth of a first frequency to track the jitter. That is, the CR block can track and remove jitter less than the first frequency (low-frequency below the loop bandwidth) using the phase timing variation measured by TED 206. As described above, the jitter above the loop bandwidth is untracked. In at least one embodiment, the loop bandwidth is approximately 4 MHz. Alternatively, the loop bandwidth can be other frequencies. The controlled oscillator 210 can have higher phase noise than desired. One remedy is to increase the loop bandwidth in the clock recovery loop. However, the total loop delay makes it difficult to increase the clock recovery loop bandwidth without getting peaking in the jitter transfer. The TED 206 can be a type of phase detector (PD) that generates valid phase information about the jitter, but the phase information cannot be used in the clock recovery loop due to the loop delay. The control of the controlled oscillator 210 can be additionally delayed due to the loop delay. A first slicer can be used right after the equalizer block 250. The first slicer can conduct preliminary data decoding after the equalization. The decoded data and the errors, combined in the same place, are used for clock recovery. A second slicer (e.g., symbol detector 214) can decode the data after additional equalization block 212. The final decisions here are not used for clock recovery. In at least one embodiment, the jitter extraction and correction block 240 can use the unused (residual) information from the TED 206 (phase detector) to correct data at the symbol detector 214 (e.g., a final slicer, a Decision Feed-Back Equalizer (DFE), a Maximum Likelihood Sequence Estimator (MLSE), or other optimal or approximate decision algorithms). This should allow the use of phase data in a bandwidth independent of the clock recovery loop delay since the phase data is only fed forward to the signal after the CR block. The CR block will thus take care of the low-frequency (below the loop bandwidth) phase timing variations, followed by a timing correction before final symbol detection by symbol detector 214 (e.g., final slicing by a DFE or an MLSE).

In at least one embodiment, the equalizer block 250 receives the samples 203 and outputs current data based on the samples. The CR block, including the TED 206, can measure the sampling offset 207 of the current data to control the sampling of subsequent data by the ADC 202. The jitter extraction and correction block 240 can receive the current data, and the sampling offset 207 corresponds to the current data. The jitter extraction and correction block 240 uses measurements by the TED 206 to re-sample the current data (current FFE data) to obtain re-sampled data 213 based on the sampling offset 207 to remove jitter from the current data. In another embodiment, the jitter extraction and correction block 240 can be placed later in the equalizer chain.

In at least one embodiment, the jitter extraction and correction block 240 can include a filter 242 (e.g., a low-pass filter) that takes the output from the TED 206 and makes a best estimate of the timing error at the time and forgets the phase information that is corrected by the CR block with a delay. In some cases, this can be considered a lowpass filtering of the phase delay estimates. In at least one embodiment, the filter 242 filters the sampling offset 207 to obtain a filtered sampling offset 215. In at least one embodiment, the filter 242 is an FIR filter. In another embodiment, the filter 242 is a running average block. The running average block can be a special case of an FIR filter.

In at least one embodiment, the jitter extraction and correction block 240 includes a re-sample block 244. The re-sample block can re-sample the current data to obtain re-sampled data 213 using the filtered sampling offset 215. In at least one embodiment, to apply the correction, an anti-symmetric multi-tap FFE (e.g., c=[−k, 1, +k]) can be applied to the current data before the symbol detector 214 (e.g., MSLE). This timing correction works particularly well in a reduced bandwidth receiver (less aliasing) employing a DFE and MLSE or similarly. In at least one embodiment, the filter 242 can operate at a second frequency greater than the first frequency of the clock recovery loop. For example, the second frequency can be approximately 150 MHz. Alternatively, the second frequency can be other frequencies.

In at least one embodiment, the re-sample block 244 can include an interpolation function. In at least one embodiment, the re-sample block 244 can include an FIR filter. In at least one embodiment, the FIR filter is a multi-tap FIR filter, such as a 3-tap FIR filter, a 5-tap FIR filter, or other FIR filters with additional taps. In at least one embodiment, the jitter extraction and correction block 240 includes a delay element coupled between the output of the equalizer block 250 and the re-sample block 244. In at least one embodiment, the delay element can delay the current data to align the current data with the sampling offset 207 (phase-offset value) corresponding to the current data.

In at least one embodiment, the jitter extraction block 244 includes an estimator block to determine an average phase offset over a specified time by multiplying a measurement of an instantaneous phase offset during a number of clock cycles by a first parameter value to obtain a running sum. In at least one embodiment, the jitter extraction block 244 includes a phase detector gain block to determine a phase-offset value based on the running sum average phase offset value. The jitter extraction block 244 includes a delay block to delay the current data to align the current data with the phase-offset value corresponding to the current data. The re-sample block re-samples the current data using the phase-offset value to obtain the re-sampled data 213.

In at least one embodiment, the digital signal processing circuit 204 further includes an additional equalization block 212 to further equalize the re-sampled data 213 to obtain equalized data 217 fed into the symbol detector 214. In at least one embodiment, the symbol detector 214 is a slicer. In another embodiment, the symbol detector 214 includes an MLSE block. The symbol detector 214 outputs the symbols 219.

Figure 3A:
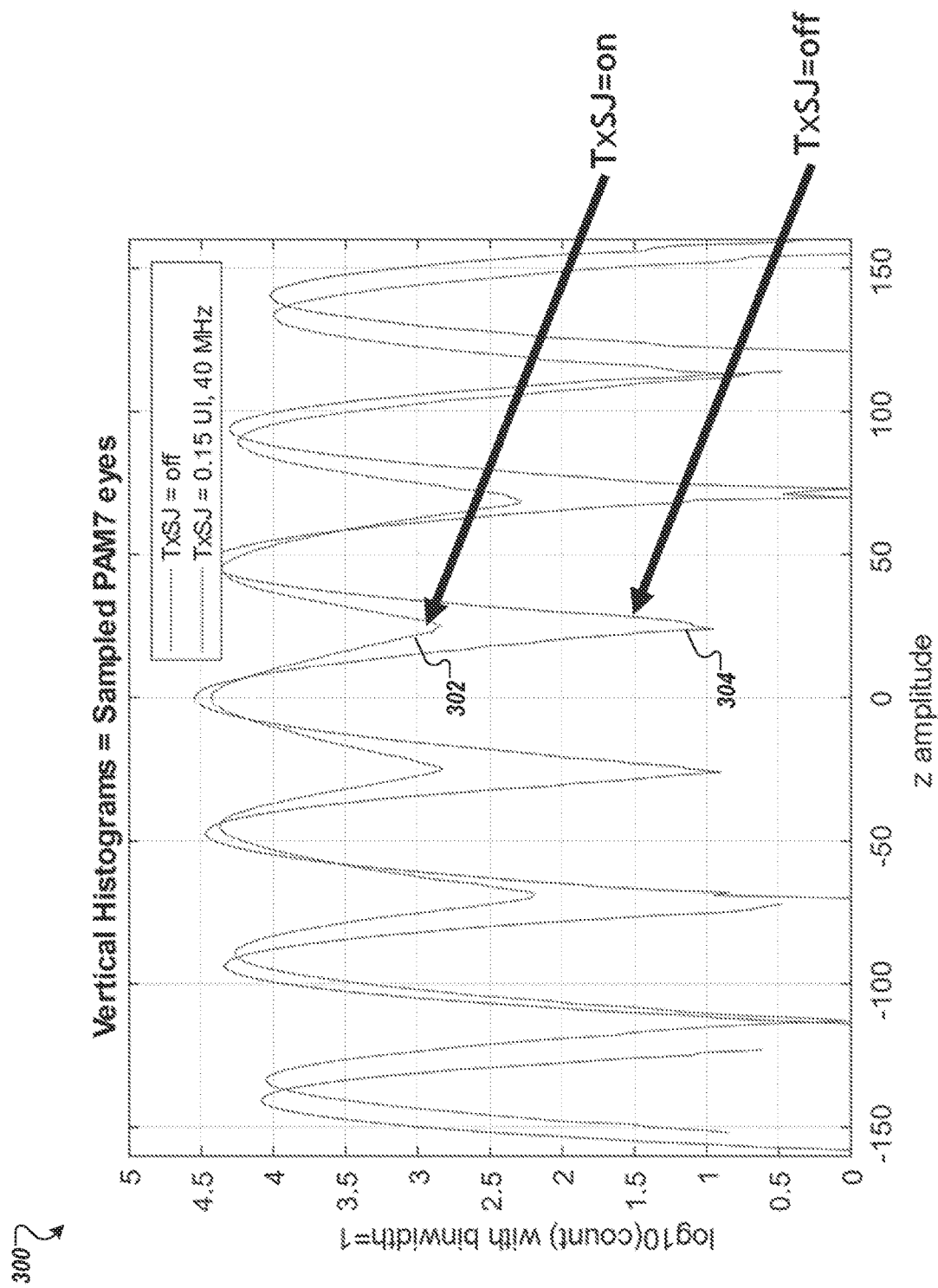
FIG. 3A is a graph of vertical histograms of simulated low-bandwidth sampled PAM7 eyes with sampling jitter and without sampling jitter, according to at least one embodiment.

FIG. 3A is a graph 300 of vertical histograms of simulated low-bandwidth sampled PAM7 eyes with sampling jitter and without sampling jitter, according to at least one embodiment. Graph 300 illustrates seven vertical histograms (log 10(count) of 2,016,000 symbols with a bin width of 1). In this example, an equalizer block (FFE block) output is measured with and without sinusoidal transmit jitter above the clock recovery (CR) loop frequency. In this example, the sinusoidal jitter is 0.15 unit interval (UI) at 40 MHz. As illustrated in FIG. 3A, the sampling jitter above the loop bandwidth closes the sampled PAM7 eye, as shown with a first signal 302 representing the equalizer output with sinusoidal transmit jitter and a second signal 304 representing the equalizer output without. The sampled PAM7 eyes close due to sampling jitter and untracked jitter from the CR block.

FIGS. 3B-3G are graphs 310-370 of vertical histograms of sampled PAM7 eyes of an output of the equalizer block and an output of the jitter correction block according to at least one embodiment. As described above, the jitter correction block can remove the sinusoidal jitter above the loop bandwidth of the CR block up to a certain frequency determined system noise and configuration of the jitter correction block.

Figure 3B:
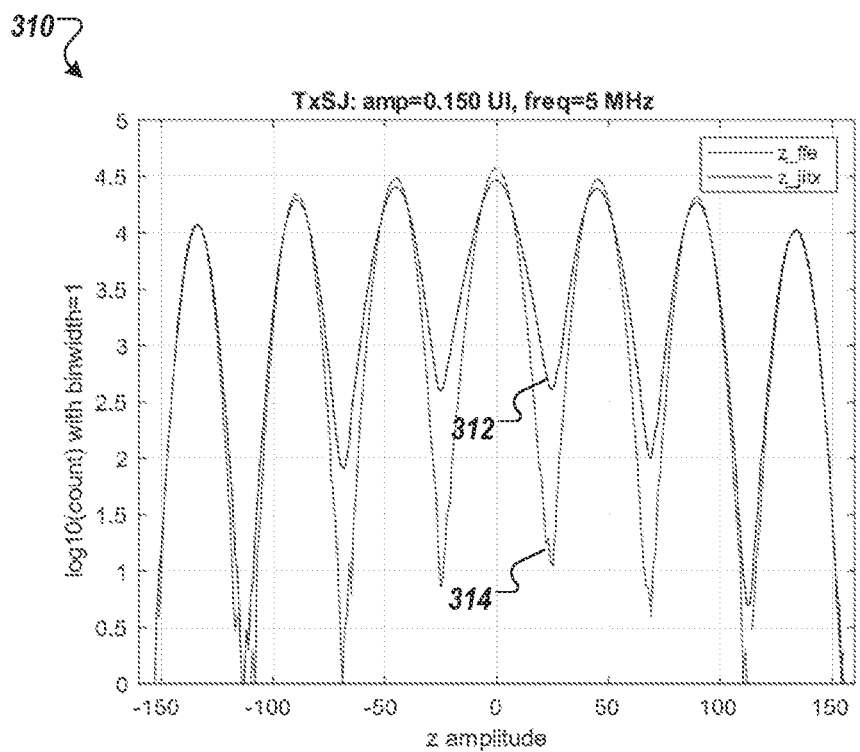
FIGS. 3B-3G are graphs of vertical histograms of sampled PAM7 eyes of an output of the equalizer block and an output of the jitter correction block, according to at least one embodiment.

In FIG. 3B, graph 310 illustrates a first signal 312 at an output of the equalizer block and a second signal 314 at an output of the jitter correction block. In this example, the sinusoidal jitter is 0.150 UI at 5 MHz. As illustrated in graph 310, the jitter correction block opens the sampled PAM7 eyes.

Figure 3C:
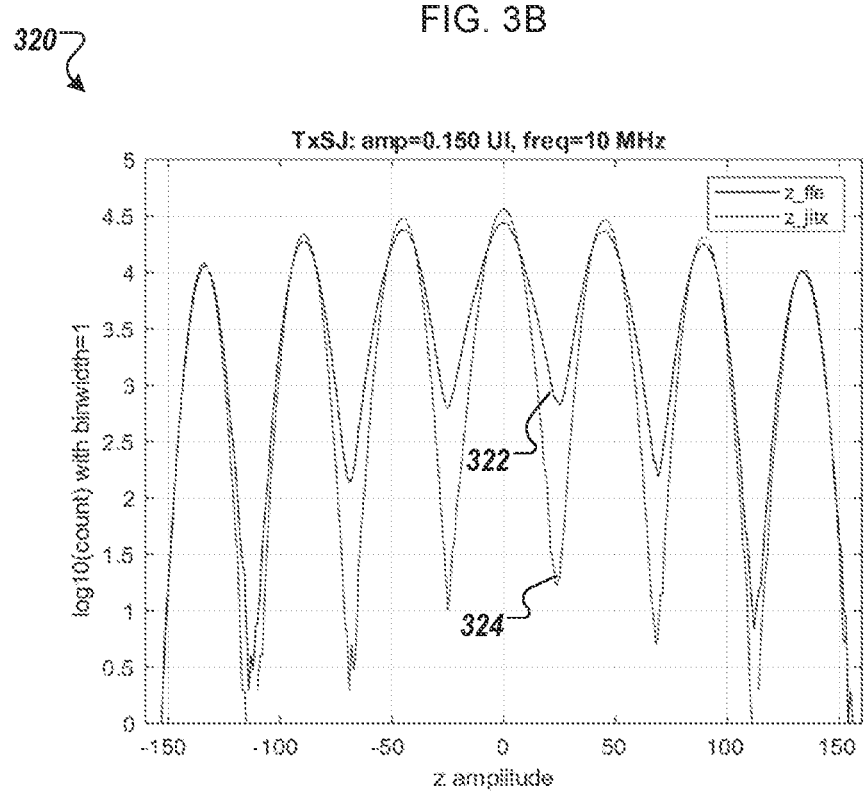

In FIG. 3C, graph 320 illustrates a first signal 322 at an output of the equalizer block and a second signal 324 at an output of the jitter correction block. In this example, the sinusoidal jitter is 0.150 UI at 10 MHz. As illustrated in graph 320, the jitter correction block opens the sampled PAM7 eyes above.

Figure 3D:
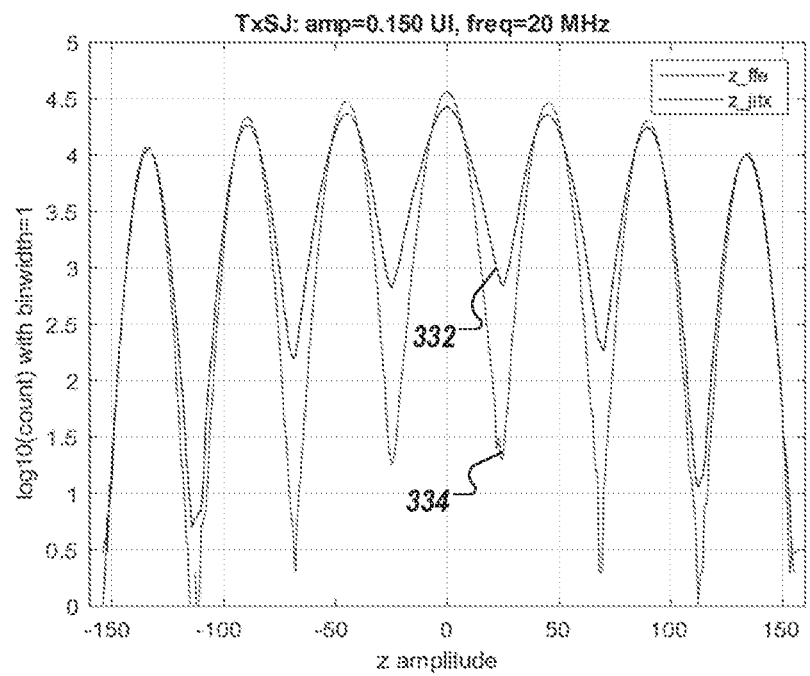

In FIG. 3D, graph 330 illustrates a first signal 332 at an output of the equalizer block and a second signal 334 at an output of the jitter correction block. In this example, the sinusoidal jitter is 0.150 UI at 20 MHz. As illustrated in graph 330, the jitter correction block opens the sampled PAM7 eyes.

Figure 3E:
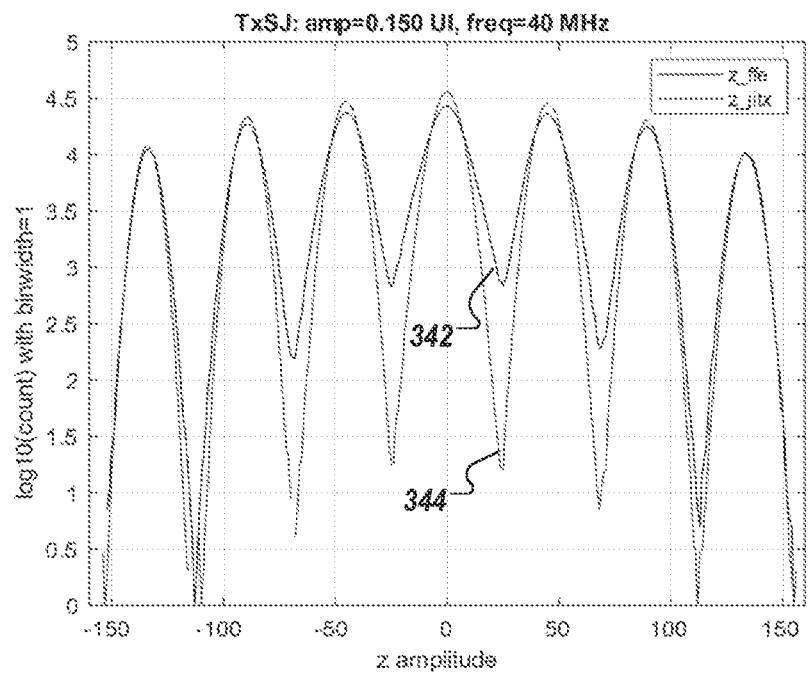

In FIG. 3E, graph 340 illustrates a first signal 342 at an output of the equalizer block and a second signal 344 at an output of the jitter correction block. In this example, the sinusoidal jitter is 0.150 UI at 40 MHz. As illustrated in graph 340, the jitter correction block opens the sampled PAM7.

Figure 3F:
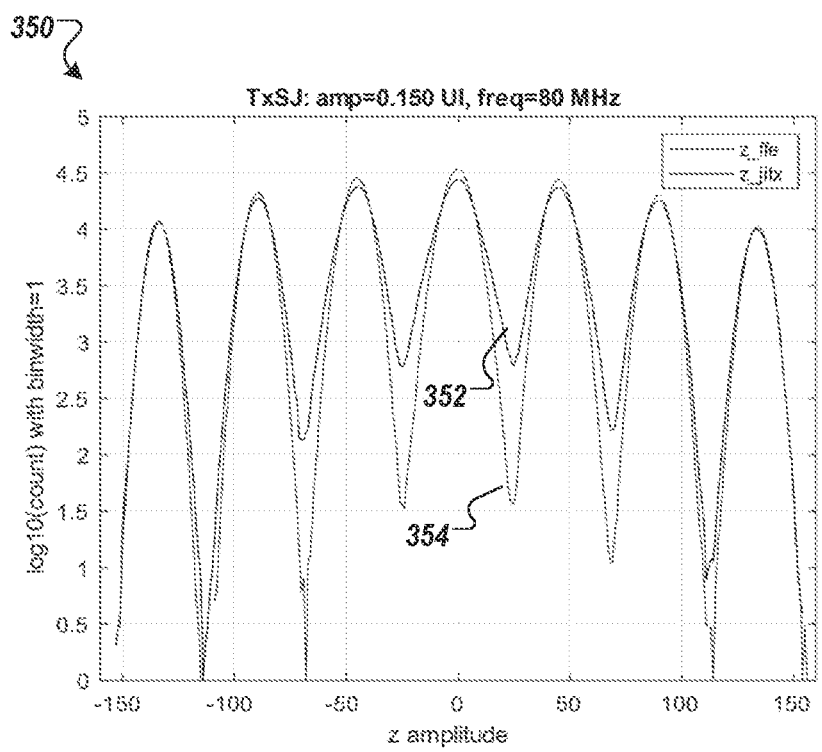

In FIG. 3F, graph 350 illustrates a first signal 352 at an output of the equalizer block and a second signal 354 at an output of the jitter correction block. In this example, the sinusoidal jitter is 0.150 UI at 80 MHz. As illustrated in graph 350, the jitter correction block opens the sampled PAM7.

Figure 3G:
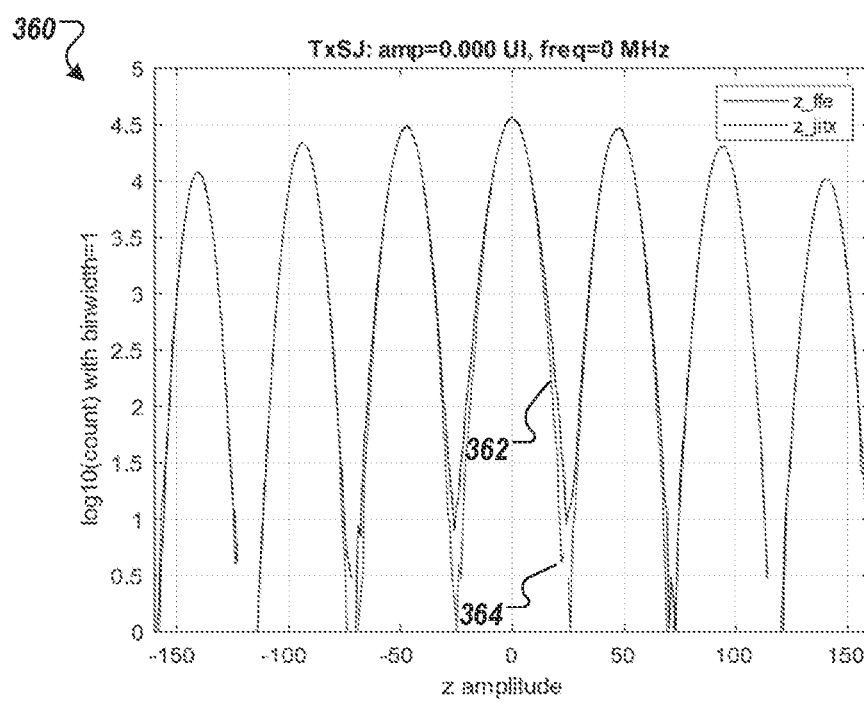

In FIG. 3G, the graph 360 illustrates a first signal 362 at an output of the equalizer block and a second signal 364 at an output of the jitter correction block. In this example, the sinusoidal jitter is turned off (e.g., 0.000 UI at 0 MHz). As illustrated in graph 360, the jitter correction block opens the sampled PAM7. The eye opening after the jitter correction block is due to tracking of the colored random transmitter and receiver jitter above the clock recovery loop bandwidth from both the transmitter and the receiver. This jitter is present in all simulated signals used for FIGS. 3A-3G, but its magnitude is for illustration purposes chosen to be fairly small.

As illustrated and described above with respect to FIGS. 3B-3G, the opening in the vertical sampled PAM7 eyes is significant, resulting in BER improvements. In some cases, the BER can improve from 1E-4 to 1E-6. Alternatively, other BER improvements can be achieved in other implementations.

Figure 4:
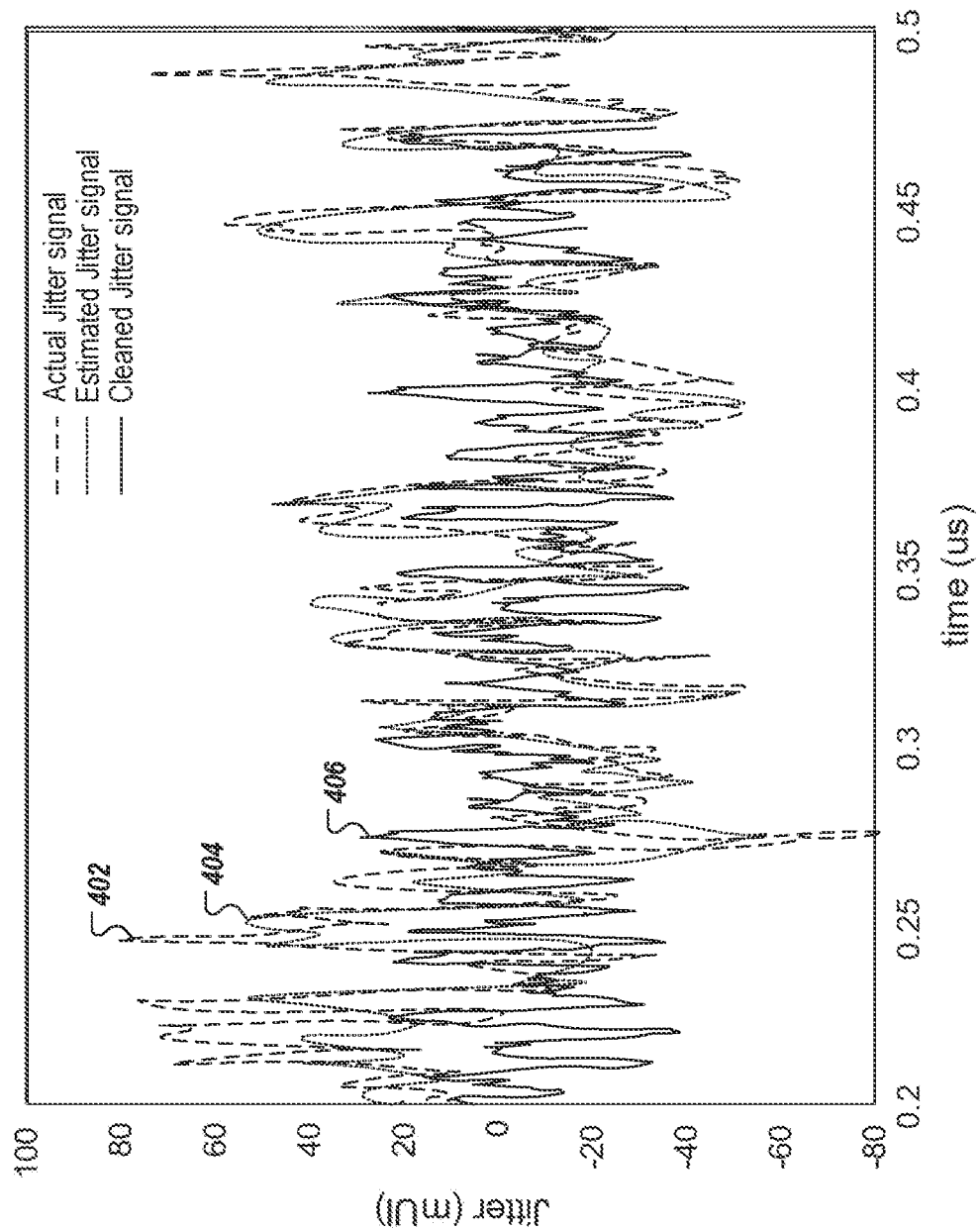
FIG. 4 is a graph illustrating an actual jitter signal, an estimated jitter signal, and a cleaned jitter signal after jitter correction, according to at least one embodiment.

FIG. 4 is a graph 400 illustrating an actual jitter signal 402, an estimated jitter signal 404, and a cleaned jitter signal 406 after jitter correction, according to at least one embodiment. As described above, the jitter correction block can receive the actual jitter signal 402 and estimate the jitter, as shown in the estimated jitter signal 404. Based on the estimate, the jitter correction block can remove the estimated jitter to generate the cleaned jitter signal 406.

Figure 5:
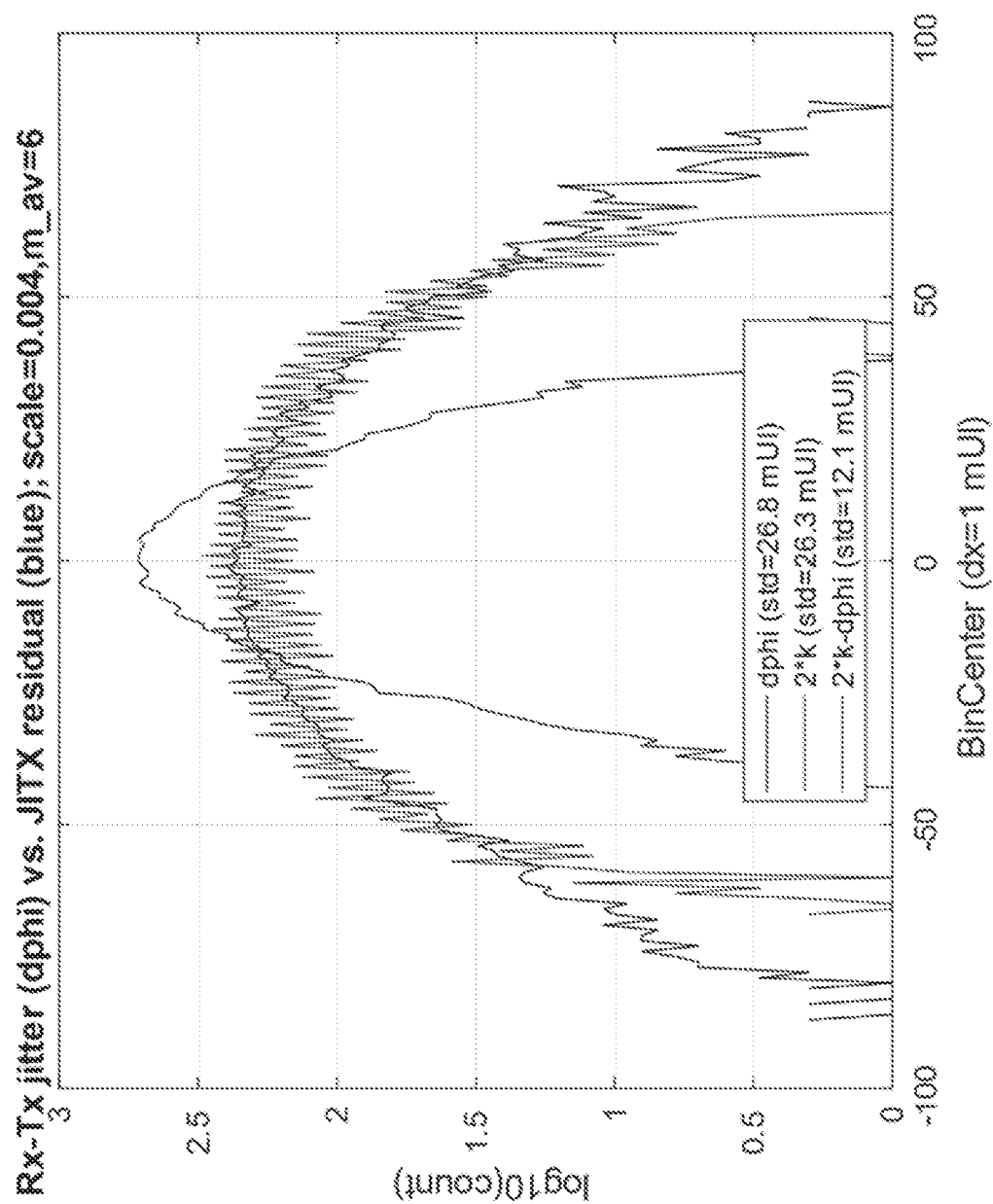
FIG. 5 is a graph of histograms of an actual jitter signal, a jitter correction signal, and a cleaned jitter signal after jitter correction, according to at least one embodiment.

FIG. 5 is a graph 500 of histograms of an actual jitter signal 502, a jitter correction signal 504, and a cleaned jitter signal 506 after jitter correction, according to at least one embodiment. As described above, the jitter correction block can receive the actual jitter signal 502 and estimate the jitter to produce a jitter correction signal 504. By applying the jitter correction signal 504 to the actual jitter signal 502, the jitter correction block produces a cleaned jitter signal 506, effectively removing some or all of the estimated jitter. In at least one embodiment, the jitter correction block can achieve an improvement in jitter from 26.8 mUI to 12.3 mUI, as illustrated in FIG. 5.

Figure 6A:
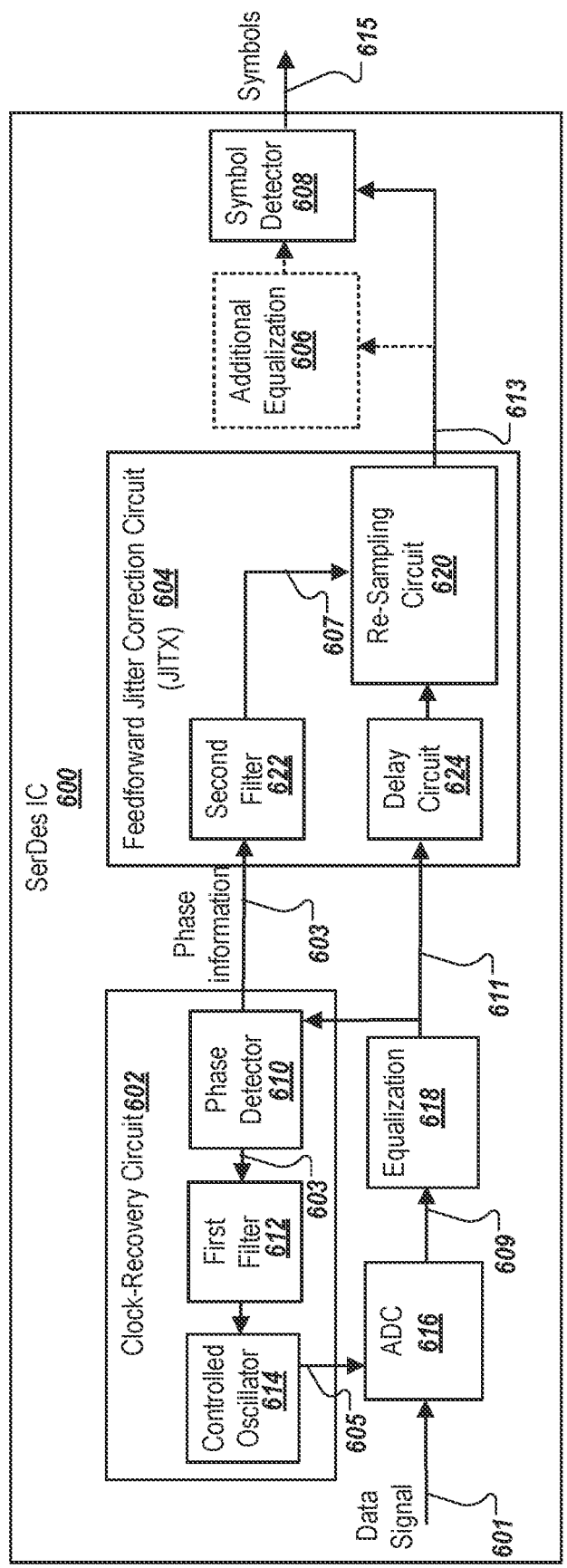
FIG. 6A is a block diagram of a Serializer-Deserializer (SerDes) integrated circuit (IC) with a feedforward jitter correction circuit, according to at least one embodiment.

FIG. 6A is a block diagram of a SerDes IC 600 with a feedforward jitter correction circuit (JITX) 604, according to at least one embodiment. SerDes IC 600 can be a transceiver that converts parallel data to serial data and vice versa. SerDes IC 600 can facilitate transmission between two devices over serial streams, reducing the number of data paths, wires/traces, terminals, etc. SerDes IC 600 includes a clock-recovery circuit 602 and a JITX 604. The clock-recovery circuit 602 can be coupled to an ADC 616 and an equalization block 618. The JITX 604 can be coupled to an output of the clock-recovery circuit 602. In another embodiment, SerDes IC 600 can include additional equalization block 606 before a symbol detector 608. In at least one embodiment, the additional equalization block 606 is coupled to the output of the JITX 604 before the symbol detector 608. In another embodiment, the feedforward jitter correction circuit 604 is coupled to an output of the additional equalization block 606 before the symbol detector 608. In at least one embodiment, the clock-recovery circuit 602 includes a phase detector 610 to determine phase information 603 about a transmit clock used to transmit a data signal 601 to the SerDes IC 600. The clock-recovery circuit 602 uses the phase information 603 from the phase detector 610 to control a receiver sampling clock 605 in a closed-loop fashion. The clock-recovery circuit 602 receives the data signal 601 and uses the phase information 603 to determine or adjust the receiver sampling clock 605 for subsequent data in the data signal 601. The JITX 604 uses the phase information 603 to control a re-sampling clock 607 in an open-loop fashion to compensate for sampling jitter above a loop bandwidth of the clock-recovery circuit 602.

In at least one embodiment, the clock-recovery circuit 602 includes a feedback loop with the phase detector 610, a first filter 612, and a controlled oscillator (CO) 614 in a closed feedback loop. The CO 614 can be a DCO, a VCO, or the like, as described herein. The ADC 616 generates samples 609 of the data signal 601 using the receiver sampling clock 605. The equalization block 618 determines current data based on the samples 609 and provides an equalization output 611. The equalization output 611 is also used by the phase detector 610 to determine the phase information. The phase detector 610 can measure a phase offset corresponding to the current data. The first filter 612 can filter the phase offset and control the CO 614 based on the filtered phase offset. The clock-recovery circuit 602 can operate with a loop bandwidth at a first frequency (e.g., 4 MHz). The CO 614 can provide the receiver sampling clock 605 based on an output of the first filter 612.

In at least one embodiment, the JITX 604 includes a second filter 622 and a re-sampling circuit 620. The second filter 622 can receive the phase information 603 from the phase detector 610. The second filter 622 can filter the phase offset to remove the sampling jitter above the first frequency to obtain a filtered phase offset. In at least one embodiment, the second filter 622 can be a running average filter, an FIR filter (e.g., a weighted average), a Kalman filter, or the like. In another embodiment, the second filter 622 is an estimator block that determines an average phase offset over a specified time. The estimator can multiply a measurement of an instantaneous phase offset during a number of clock cycles by a first parameter (e.g., averaging length). The filtered phase offset can be the re-sampling clock 607 or used to generate the re-sampling clock 607 used to re-sample the current data. For example, a phase detector gain block can determine a phase-offset value based on the average phase offset value. The phase detector gain block can convert the average phase offset in terms of a running sum into the phase offset values used by the re-sampling circuit 620. The re-sampling circuit 620 can receive the equalization output 611 and re-samples the equalization output 611 to obtain re-sampled data 613. In another embodiment, the JITX 604 includes a delay circuit 624 that delays the equalization output 611 before the re-sampling circuit 620. This can be done to align the phase information 603 with the current data, given the delay in the clock-recovery circuit 602. The re-sampled data 613 can be input into the symbol detector 608 to generate symbols 615. In another embodiment, the re-sampled data 613 can be input into the additional equalization block 606 before being input into the symbol detector 608.

In at least one embodiment, the second filter 622 determines an average phase offset based on a number of phase offset measurements and multiples the average phase offset by a phase detector gain to obtain the re-sampling clock 607. In at least one embodiment, the re-sampling circuit 620 includes a multi-tap finite impulse response filter (FIR) filter (e.g., 3-tap or 5-tap FIR filter).

Figure 6B:
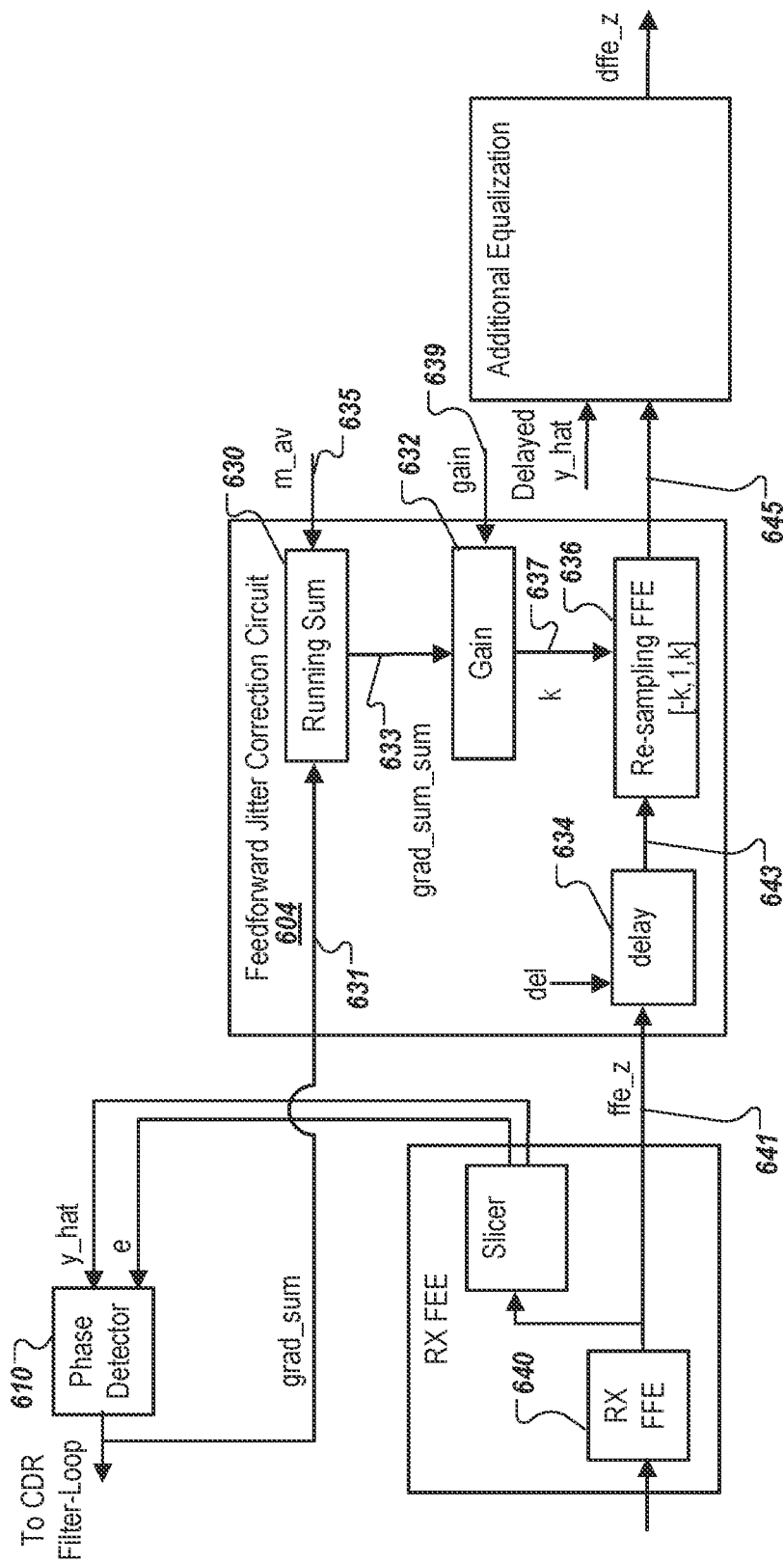
FIG. 6B is a block diagram of a feedforward jitter correction circuit, according to at least one embodiment.

FIG. 6B is a block diagram of a feedforward jitter correction circuit (JITX) 604, according to at least one embodiment. The JITX 604 of FIG. 6B includes a running sum block 630, a gain block 632, a delay block 634, and a re-sampling FFE block 636. As described above, the phase detector 610 can generate phase information. In this embodiment, the phase detector 610 can output an up-down sum value 631 (updown_sum). The up-down sum value 631 is the sum of all ups less the sum of all downs. For example, the value can range between [−64, +64]. The up-down sum value 631 can be a measurement of the instantaneous phase offset during the last number of clock cycles (e.g., 64 T). The running sum block 630 can receive the up-down sum value 631 and determine a running average 633 (updown_sum_sum) of the up-down sum values 631 over time. In at least one embodiment, the running sum block 630 can receive a first parameter 635, averaging length, m_av. In at least one embodiment, the first parameter 635 is 6. Alternatively, other values can be used for the first parameter 635. The first parameter 635 can be multiplied by the number of clock cycles (e.g., 64 T) to obtain an amount of time over which the running average 633 is determined (e.g., 6.64 T=3.61 ns=(277 MHz)$^{-1}$). The gain block 632 receives the running average 633 and determines a phase estimate value 637, k. In at least one embodiment, the gain block 632 can receive a second parameter 639, referred to as a phase detector gain (gain=scale/m_av). The phase detector gain is the scale divided by the first parameter 635 (averaging length). The phase detector gain can be used to convert from a domain used for the up-down sum values (up-down sum) to phase offsets. In at least one embodiment, the scale is 0.008. Alternatively, other scale values can be used. In at least one embodiment, the phase detector gain depends on a pattern selection table, inter-symbol interference (ISI), noise, or the like.

The JITX 604 receives an FFE output 641 from an equalization block (e.g., 618). The FFE output 641 is delayed by the delay block 634 to align with the corresponding phase information measured by the phase detector 610. The delay block 634 outputs a delayed FFE output 643 to the re-sampling FFE block 636. In at least one embodiment, the delay block 634 receives a third parameter (del=3). In at least one embodiment, the third parameter is the delay of the running average 633, which is half of the averaging length (first parameter 635). In at least one embodiment, the third parameter can be used to obtain alignment between FFE output 641 (ffe_out) and phase estimate (updown_sum_sum). The delayed FFE output 643 is re-sampled by the re-sampling FFE block 636 to obtain re-sampled data 645. In at least one embodiment, the re-sampling FFE block 636 is a three-tap FIR filter that receives the phase estimate value 637, k. The re-sampling FFE block 636 uses the phase estimate value 637, k for obtaining three samples (e.g., [−k, l, k]) of the delayed FFE output 643. The re-sampled data 645 can be further equalized using additional equalization and input into a symbol detector to determine the symbols of the data signal, as described herein.

Figure 7:
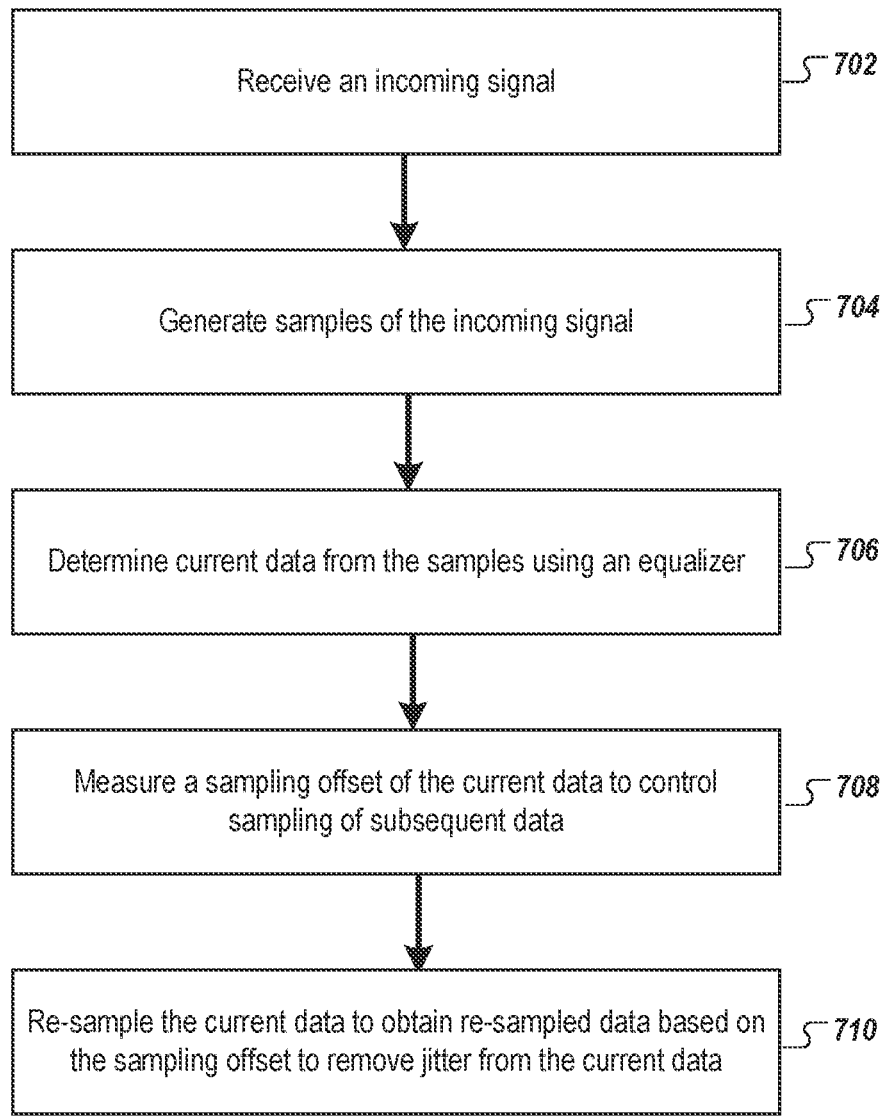
FIG. 7 is a flow diagram of a method 700 for removing jitter from an incoming signal, in accordance with at least some embodiments.

FIG. 7 is a flow diagram of a method 700 for removing jitter from an incoming signal, in accordance with at least some embodiments. The method 700 can be performed by processing logic comprising hardware, software, firmware, or any combination thereof. In at least one embodiment, the method 700 is performed by any one of device 110 or device 112 of FIG. 1 or the receiver 104 of FIGS. 1A-1B. In at least one embodiment, the method 700 is performed by the receiver 200 of FIG. 2. In another embodiment, the method 700 is performed by SerDes IC 600 of FIG. 6A. In yet another embodiment, the method 700 is performed by feed-forward jitter correction circuit 604 of FIG. 6B.

Referring to FIG. 7, the method 700 begins with the processing logic receiving an incoming signal (block 702). The processing logic generates samples of the incoming signal using an ADC (block 704). The processing logic determines current data from the samples using an equalizer block (block 706). The processing logic measures, using a TED or a phase detector of a clock recovery (CR) block, a sampling offset of the current data to control sampling of subsequent data by the ADC (block 708). The processing logic re-samples the current data to obtain re-sampled data based on the sampling offset to remove jitter from the current data (block 710), and the method 700 ends.

In a further embodiment, the processing logic filters the sampling offset of the current data using a low-pass filter at a first frequency to obtain a first filtered sampling offset. The processing logic determines a phase-offset value based on the first filtered sampling offset. The processing logic re-samples the current data by re-sampling the current data using the phase-offset value. In at least one embodiment, the processing logic uses a multi-tap FIR filter to re-sample the current data. In another embodiment, the processing logic uses a multi-tap FFE to re-sample the current data.

In a further embodiment, the processing logic filters the sampling offset to obtain a second filtered sampling offset using a loop filter of the CR block at a loop bandwidth at a second frequency higher than the first frequency. The processing logic controls the sampling of the subsequent data by the ADC based on the second filtered sampling offset.

Figure 8:
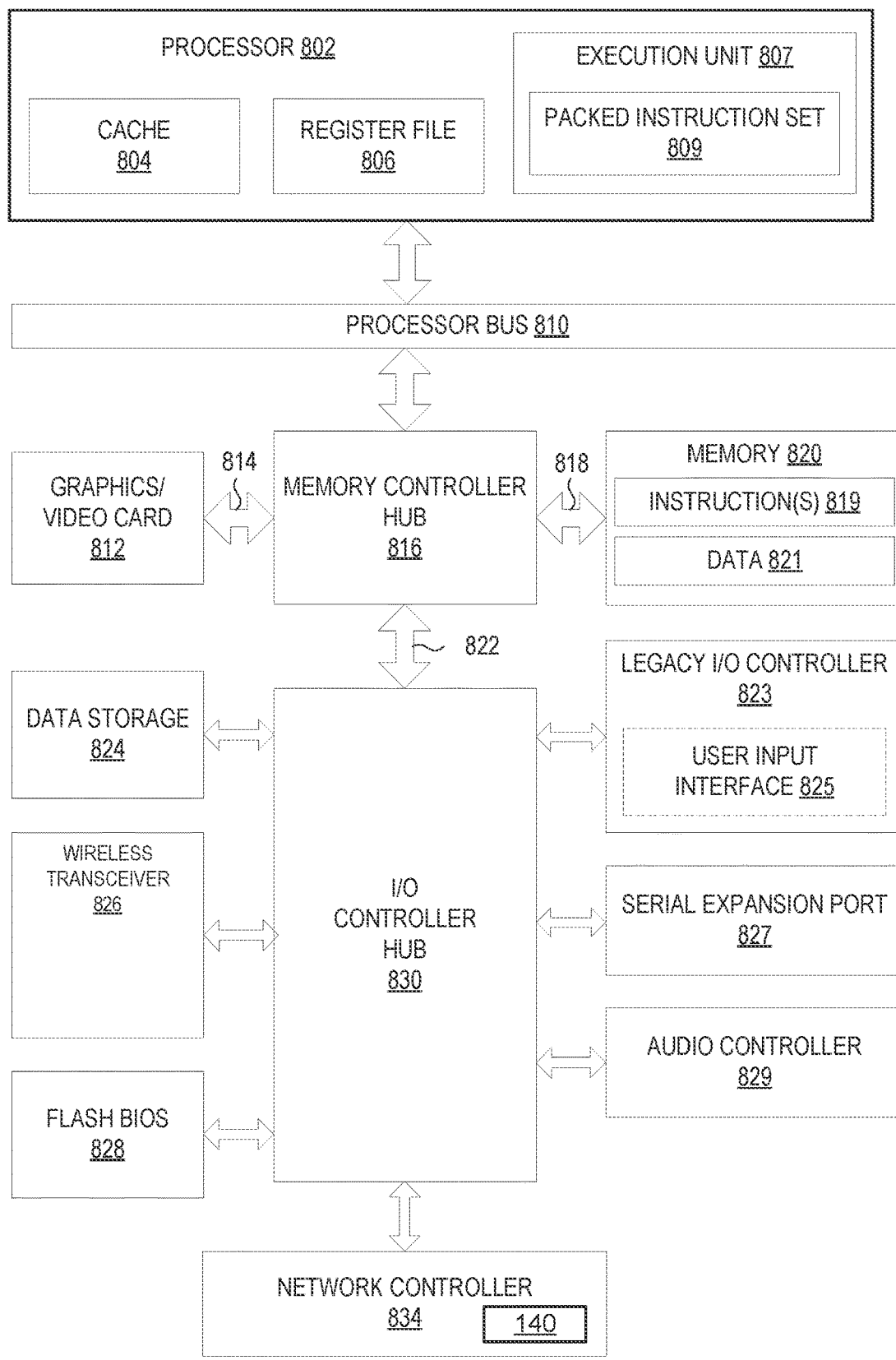
FIG. 8 illustrates an example computer system including a jitter correction block, in accordance with at least some embodiments.

FIG. 8 illustrates an example computer system 800, including a jitter correction block 140, in accordance with at least some embodiments. In at least one embodiment, computer system 800 may be a system with interconnected devices and components, an SOC, or some combination. In at least one embodiment, computer system 800 is formed with a processor 802 that may include execution units to execute an instruction. In at least one embodiment, computer system 800 may include, without limitation, a component, such as a processor 802, to employ execution units including logic to perform algorithms for processing data. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 800 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 800 may include, without limitation, processor 802 that may include, without limitation, one or more execution units 807 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 800 is a single processor desktop or server system. In at least one embodiment, computer system 800 may be a multiprocessor system. In at least one embodiment, processor 802 may include, without limitation, a CISC microprocessor, a RISC microprocessor, a VLIW microprocessor, and a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. In at least one embodiment, processor 802 may also include a combination of both internal and external caches. In at least one embodiment, a register file 806 may store different types of data in various registers including, without limitation, integer registers, floating point registers, status registers, and instruction pointer register.

In at least one embodiment, execution unit 807, including, without limitation, logic to perform integer and floating point operations, also resides in processor 802. Processor 802 may also include a microcode ("ucode") read only memory ("ROM") that stores microcode for certain macro instructions. In at least one embodiment, execution unit 807 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a DRAM device, an SRAM device, flash memory device, or other memory devices. Memory 820 may store instruction(s) 819 and/or data 821 represented by data signals that may be executed by processor 802.

In at least one embodiment, a system logic chip may be coupled to a processor bus 810 and memory 820. In at least one embodiment, the system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data, and textures. In at least one embodiment, MCH 816 may direct data signals between processor 802, memory 820, and other components in computer system 800 and may bridge data signals between processor bus 810, memory 820, and a system I/O 822. In at least one embodiment, a system logic chip may provide a graphics port for coupling to a graphics controller. In at least one embodiment, MCH 816 may be coupled to memory 820 through high bandwidth memory path 818, and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing a user input interface 825, a keyboard interface, a serial expansion port 827, such as a USB, and a network controller 834. In at least one embodiment, the network controller 834 includes the jitter correction block 140 as described herein. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips." In at least one embodiment, FIG. 8 may illustrate an example SoC. In at least one embodiment, devices illustrated in FIG. 8 may be interconnected with proprietary interconnects, standardized interconnects (e.g., PCIe), or some combination thereof. In at least one embodiment, one or more components of system 800 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiver device comprising:
   an analog-to-digital converter (ADC) to sample an incoming signal to obtain samples; and
   a signal processing circuit coupled to the ADC, wherein the signal processing circuit comprises:
      an equalizer block coupled to the ADC to receive the samples and output current data based on the samples;
      a clock recovery (CR) block comprising a timing error detector (TED) to measure a sampling offset of the current data to control sampling of subsequent data by the ADC; and
      a jitter extraction block coupled to the CR block, wherein the jitter extraction block is to re-sample the current data to obtain re-sampled data based on the sampling offset to remove jitter from the current data.

2. The receiver device of claim 1, wherein the CR block comprises:
   the TED coupled to an output of the equalizer block;
   a first filter coupled to an output of the TED; and
   a controlled oscillator (CO) coupled to an output of the first filter, wherein the CO is to control the sampling by the ADC.

3. The receiver device of claim 1, wherein the jitter extraction block comprises:
   a second filter coupled to an output of the TED, the second filter to filter the sampling offset to obtain a filtered sampling offset; and
   a re-sample block coupled to the second filter and an output of the equalizer block, the re-sample block to re-sample the current data to obtain the re-sampled data using the filtered sampling offset.

4. The receiver device of claim 3, wherein the CR block is to operate at a loop bandwidth of a first frequency, and wherein the second filter is to operate at a second frequency greater than the first frequency.

5. The receiver device of claim 3, wherein the re-sample block comprises an interpolation function.

6. The receiver device of claim 3, wherein the re-sample block comprises a multi-tap finite impulse response (FIR) filter.

7. The receiver device of claim 3, wherein the jitter extraction block comprises a delay element coupled between the output of the equalizer block and the re-sample block.

8. The receiver device of claim 1, wherein the jitter extraction block comprises:
   an estimator block to determine an average phase offset over a specified time by multiplying a measurement of an instantaneous phase offset during a number of clock cycles by a first parameter value;
   a phase detector gain block to determine a phase-offset value based on the average phase offset value;
   a delay block to delay the current data to align the current data with the phase-offset value corresponding to the current data; and
   a re-sample block to re-sample the current data using the phase-offset value to obtain the re-sampled data.

9. The receiver device of claim 1, further comprising:
   an additional equalization block coupled to the jitter extraction block; and
   a symbol detector coupled to the additional equalization block.

10. A method comprising:
    generating samples of an incoming signal using an analog-to-digital converter (ADC);
    determining current data from the samples using an equalizer block;
    measuring, using a timing error detector (TED) of a clock recovery (CR) block, a sampling offset of the current data to control sampling of subsequent data by the ADC; and
    re-sampling the current data to obtain re-sampled data based on the sampling offset to remove jitter from the current data.

11. The method of claim 10, further comprising:
    filtering the sampling offset of the current data using a low-pass filter at a first frequency to obtain a first filtered sampling offset; and
    determining a phase-offset value based on the first filtered sampling offset, wherein re-sampling the current data comprises re-sampling the current data using the phase-offset value.

12. The method of claim 11, further comprising:
    filtering the sampling offset to obtain a second filtered sampling offset using a loop filter of the CR block at a loop bandwidth at a second frequency higher than the first frequency; and
    controlling the sampling of the subsequent data by the ADC based on the second filtered sampling offset.

13. The method of claim 10, wherein re-sampling the current data comprises re-sampling the current data using a three-tap finite impulse response (FIR) filter.

14. A communication system comprising:
    a transceiver comprising a transmitter and a receiver, wherein the receiver comprise:
       an analog-to-digital converter (ADC) to sample an incoming signal to obtain samples; and
       a signal processing circuit coupled to the ADC, wherein the signal processing circuit comprises:
          an equalizer block coupled to the ADC to receive the samples and output current data based on the samples;
          a clock recovery (CR) block comprising a timing error detector (TED) to measure a sampling offset of the current data to control sampling of subsequent data by the ADC; and
          a jitter extraction block coupled to the CR block, wherein the jitter extraction block is to re-sample the current data to obtain re-sampled data based on the sampling offset to remove jitter from the current data.

15. The communication system of claim 14, wherein the CR block comprises:
- the TED coupled to an output of the equalizer block;
- a first filter coupled to an output of the TED; and
- a controlled oscillator (CO) coupled to an output of the first filter, wherein the CO is to control the sampling by the ADC.

16. The communication system of claim 14, wherein the jitter extraction block comprises:
- a second filter coupled to an output of the TED, the second filter to filter the sampling offset to obtain a filtered sampling offset; and
- a re-sample block coupled to the second filter and an output of the equalizer block, the re-sample block to re-sample the current data to obtain the re-sampled data using the filtered sampling offset.

17. The communication system of claim 16, wherein the CR block is to operate at a loop bandwidth of a first frequency, and wherein the second filter is to operate at a second frequency greater than the first frequency.

18. The communication system of claim 16, wherein the re-sample block comprises an interpolation function.

19. The communication system of claim 16, wherein the re-sample block comprises a multi-tap finite impulse response (FIR) filter.

20. The communication system of claim 16, wherein the jitter extraction block comprises a delay element coupled between the output of the equalizer block and the re-sample block.

\* \* \* \* \*